(12) United States Patent
Mao et al.

(10) Patent No.: US 12,472,737 B2
(45) Date of Patent: Nov. 18, 2025

(54) FILM LAYING APPARATUS AND LAYING METHOD

(71) Applicant: Suzhou Shengcheng Solar Equipment Co., Ltd., Suzhou (CN)

(72) Inventors: Jiliang Mao, Suzhou (CN); Yuhao Pang, Suzhou (CN); Mingxing Yang, Suzhou (CN); Chunxin Wu, Suzhou (CN)

(73) Assignee: Suzhou Shengcheng Solar Equipment Co., Ltd. (CN)

(*) Notice: Subject to any disclaimer, the term of this patent is extended or adjusted under 35 U.S.C. 154(b) by 0 days.

(21) Appl. No.: 18/860,233

(22) PCT Filed: Dec. 13, 2022

(86) PCT No.: PCT/CN2022/138619
§ 371 (c)(1),
(2) Date: Oct. 25, 2024

(87) PCT Pub. No.: WO2023/207131
PCT Pub. Date: Nov. 2, 2023

(65) Prior Publication Data
US 2025/0108594 A1    Apr. 3, 2025

(30) Foreign Application Priority Data
Apr. 28, 2022 (CN) .......... 202210463603.X (51) Int. Cl.
*B32B 38/00* (2006.01)
*B32B 37/10* (2006.01)
(Continued)

(52) U.S. Cl.
CPC .......... *B32B 38/0004* (2013.01); *B32B 37/10* (2013.01); *B32B 38/04* (2013.01);
(Continued)

(58) Field of Classification Search
CPC ..... B32B 38/0004; B32B 37/10; B32B 38/04; B32B 38/1841; B32B 2038/042
See application file for complete search history.

(56) References Cited

FOREIGN PATENT DOCUMENTS

| CN | 102259774 A | 11/2011 |
|---|---|---|
| CN | 103979359 A | 8/2014 |

(Continued)

OTHER PUBLICATIONS

International Search Report and Written Opinion dated Feb. 11, 2023, for PCT Application No. PCT/CN2022/138619.
(Continued)

*Primary Examiner* — George R Koch
*Assistant Examiner* — Christopher C Caillouet
(74) *Attorney, Agent, or Firm* — Karen A. LeCuyer; DeWitt LLP (57) ABSTRACT

A film laying apparatus and laying method are provided. The apparatus includes a panel conveying mechanism and a film laying mechanism arranged above the panel conveying mechanism. The film laying mechanism includes a first driving member, a first supporting plate driven by the first driving member to move horizontally, a film feeding unit and a cutting unit arranged on the first supporting plate, and a tail end pressing unit that presses tightly a tail end of a film on the surface of a panel, and the cutting unit is located on a film output side of the film feeding unit.

11 Claims, 8 Drawing Sheets

(51) Int. Cl.
*B32B 38/04* (2006.01)
*B32B 38/18* (2006.01)

(52) U.S. Cl.
CPC .... *B32B 38/1841* (2013.01); *B32B 2038/042* (2013.01); *B32B 2309/06* (2013.01); *B32B 2457/12* (2013.01)

(56) References Cited

FOREIGN PATENT DOCUMENTS

| | | |
|---|---|---|
| CN | 204538059 U | 8/2015 |
| CN | 105958101 A | 9/2016 |
| CN | 205723809 U | 11/2016 |
| CN | 106743934 A | 5/2017 |
| CN | 109103287 A | 12/2018 |
| CN | 211055531 U | 7/2020 |
| CN | 112390048 A | 2/2021 |
| CN | 112850309 A | 5/2021 |
| CN | 214219243 U | 9/2021 |
| CN | 214354785 U | 10/2021 |
| CN | 113944930 A | 1/2022 |
| CN | 215755272 U | 2/2022 |
| CN | 114132778 A | 3/2022 |
| CN | 115050847 A | 9/2022 |
| CN | 217534920 U | 10/2022 |
| JP | H 10309137 A | 11/1998 |
| KR | 930014940 A | 7/1993 |
| TW | M 281902 U | 12/2005 |
| WO | WO-2022105092 A1 * | 5/2022 ............. B65H 19/10 |

OTHER PUBLICATIONS

First Office Action dated Dec. 1, 2023, for Chinese Application No. 202210463603.X.

* cited by examiner

FILM LAYING APPARATUS AND LAYING METHOD

CROSS-REFERENCE TO RELATED APPLICATIONS

This is a National Stage Application, filed under 35 U.S.C. 371, of International Patent Application No. PCT/CN2022/138619, filed on Dec. 13, 2022, which claims priority of a Chinese Patent Application filed with the China National Intellectual Property Administration (CNIPA) on Apr. 28, 2022, with application number No. 202210463603.X, the contents of which are incorporated herein by reference in their entireties.

TECHNICAL FIELD

The present application relates to the technical field of film covering equipment, for example, it relates to a film laying apparatus and laying method.

BACKGROUND

In the context of energy conservation and environmental protection, the development and application of new energy sources are becoming increasingly broad-based, and thus increasing the demand for new energy sources. Among them, solar power generation has developed rapidly, so the demand for solar modules has also grown rapidly. Solar modules are composed of one or two pieces of tempered glass, ethylene-vinyl acetate (EVA) copolymer film and solar cell silicon wafers are laminated at a high temperature by a laminator to form a composite layer, and solar cells are connected in series and parallel by wires to the lead ends to form photovoltaic cell modules. In the process of production, there is one procedure of laying EVA film or polyvinyl fluoride structure (Tedlar/PET/Tedlar, TPT) film. Most of the production procedures of photovoltaic modules are automated with an automated line for the entire assembly line. Therefore, the production rhythm of photovoltaic modules must meet the requirements of efficient streamlined production.

In the related art, the automatic laying machine for the EVA or TPT film generally includes several modules for film feeding, film conveying, film punching, film cutting, film pulling, and film supporting and laying. For example, an inline cutting and laying machine for EVA used in photovoltaic modules disclosed in patent CN112850309A, a film cutting and laying all-in-one machine disclosed in patent CN109103287A, an inline cutting, punching and laying all-in-one machine with dual-axis automatic loading function disclosed in patent CN113844930A. In these photovoltaic module film automatic laying mechanisms in the related art, generally, a pulling module is used to pull the film to the appropriate end position, and during the process of pulling, a film supporting and laying module is used to hold the bottom of the film to prevent the drop middle portion of the film from rubbing and dragging with the glass panel or battery panel; the pulling module is used to clamp the tail end of the film and hold it, then the film supporting and laying module is used to retreat and lay the film on the glass panel or battery panel, and finally, a cutting module is used to cut the film. These mechanisms have the following disadvantages:

1) The film feeding module and the film cutting module are generally fixedly arranged, the pulling module is separately arranged on a transfer mechanism for pulling the material, and it is necessary to coordinate with the film supporting and laying module for better film laying effects. The overall structure is relatively complex and the number of component modules is large;
2) Since the film is generally freely draped on the film supporting and laying module, and the flattening effect on the film is poor in laying, resulting in a poor laying effect;
3) There are too many mechanism actions in the entire laying process, and the laying efficiency is not high enough.

SUMMARY

A film laying apparatus and laying method are provided according to the present application, with fewer structural modules, good laying effect and high laying efficiency.

In a first aspect, a film laying apparatus is provided according to embodiments of the present application and includes a panel conveying mechanism, and a film laying mechanism arranged above the panel conveying mechanism. The film laying mechanism includes a first driving member, a first supporting plate driven by the first driving member to move horizontally, a film feeding unit and a cutting unit arranged on the first supporting plate, and a tail end pressing unit configured to press a tail end of a film onto a surface of a panel. The cutting unit is located on a film output side of the film feeding unit.

In a second aspect, a laying method is provided according to an embodiment of the present application and includes as follows.

A film feeding unit is used to clamp an end of a film and move the film from one side of a panel to the opposite side, a distance of a set height is maintained between the film and the panel; and a feeding direction of the film feeding unit is arranged at a set angle with the horizontal plane.

After the film is pulled in place, the film feeding unit continues to output a film of a set length so that an end edge of the film is tilted downward and extends out of an edge of the panel.

The film feeding unit moves horizontally backward by a set distance so that the end edge of the film is attached to a surface of the panel and moves to an initial position of film laying.

A tail end pressing unit is used to tightly press the end of the film downward so that the end of the film is tightly attached to the surface of the panel and the attachment is maintained.

The film feeding unit is driven to move horizontally and return to an initial side of the panel, a film feeding state is maintained on the way of returning, and a film feeding speed is made the same as a speed of the returning of the film feeding unit.

After the film feeding unit returns to the initial side of the panel, a cutting unit is used to cut off the film on an output side of the film feeding unit to complete the film laying.

REFERENCE LIST 100 film laying apparatus
1 panel conveying mechanism
11 conveying unit
12 panel positioning unit
121 front and rear positioning modules
122 right and left positioning modules
13 supporting roller
2 film laying mechanism
21 first driving member
22 first supporting plate
23 film feeding unit
231 lower driving roller
232 third driving member
233 upper clamping roller
234 fifth supporting plate
235 first cylinder
236 fourth supporting plate
237 hinge seat
238 film output side
24 cutting unit
240 upper cutter
241 second driving member
242 second supporting plate
243 lower cutter
244 third supporting plate
245 pressing nozzle
25 tail end pressing unit
251 second cylinder
252 pressing plate
253 lower supporting block
3 film feeding mechanism
4 buffer mechanism
41 movable roller
42 fourth driving member
43 first roller
44 second roller
45 transmission belt
5 punching mechanism

DETAILED DESCRIPTION

Reference is made to FIG. 1 to FIG. 10. A film laying apparatus 100 is provided according to this embodiment and includes a panel conveying mechanism 1, a film laying mechanism 2 arranged above the panel conveying mechanism 1, a film feeding mechanism 3 configured to feed the film laying mechanism 2, and a buffer mechanism 4 and a punching mechanism 5 provided between the film feeding mechanism 3 and the film laying mechanism 2.

In this embodiment, the conveying direction of the panel conveying mechanism 1 is perpendicular to the laying direction of the film laying mechanism 2. In other embodiments, the conveying direction of the panel conveying mechanism 1 may also be set parallel to the laying direction of the film laying mechanism 2.

Figure 8:
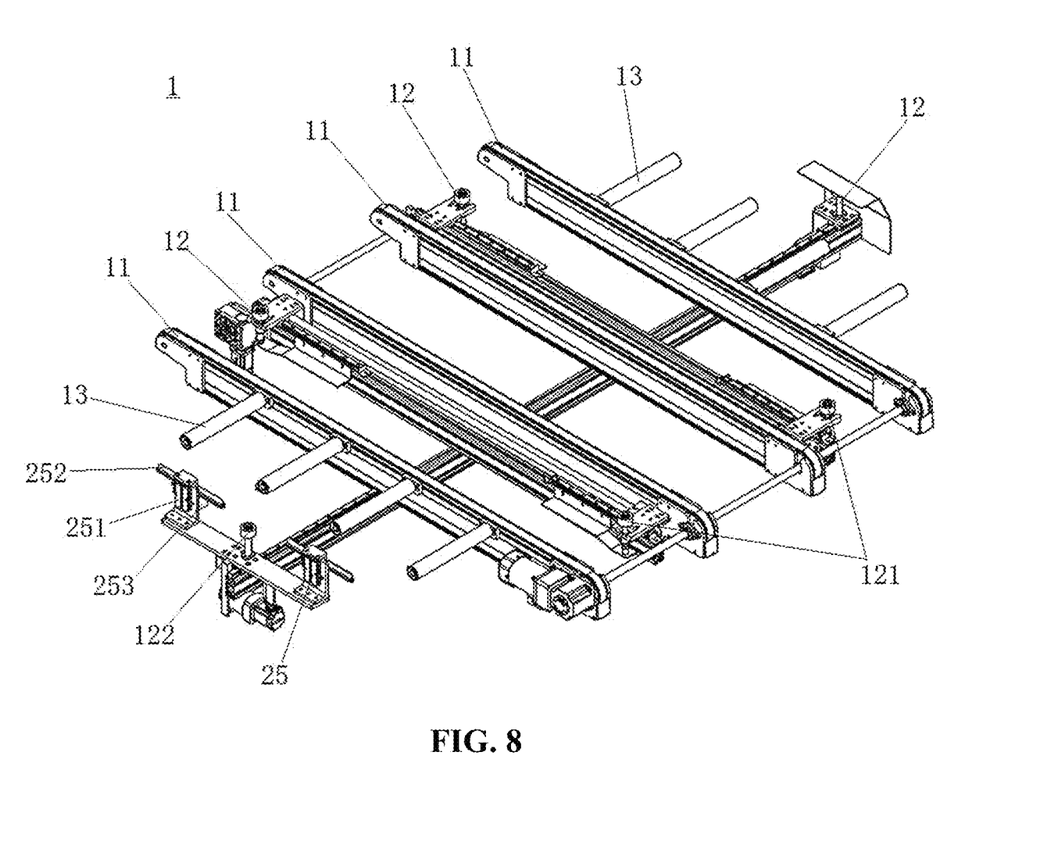
FIG. 8 is a schematic structural diagram of a panel conveying mechanism in an embodiment of the present application.

The panel conveying mechanism 1 includes a conveying unit 11 and a panel positioning unit 12 configured to position four sides of the panel on the conveying unit 11. The panel positioning unit 12 includes front and rear positioning modules 121 and right and left positioning modules 122.

In other embodiments, the panel conveying mechanism 1 may also adopt a conveying device with the function of positioning four sides of a panel in the related art, such as a "servo conveying alignment assembly" in an EVA cutting and laying machine disclosed in a patent with publication No. CN112390048A, or a conveying mechanism composed of a "conveying line and clamping and alignment component" in an efficient large solar module vertical stacking machine equipment disclosed in a patent with publication No. CN215755272U.

Figure 1:
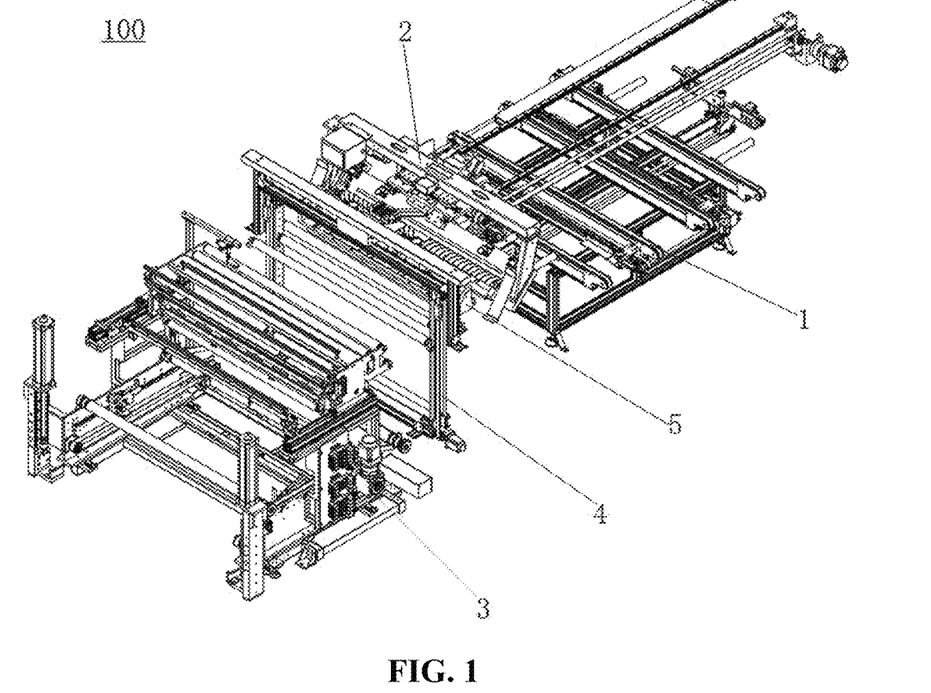
FIG. 1 is a schematic perspective view showing the structure of an embodiment of the present application.
Figure 2:
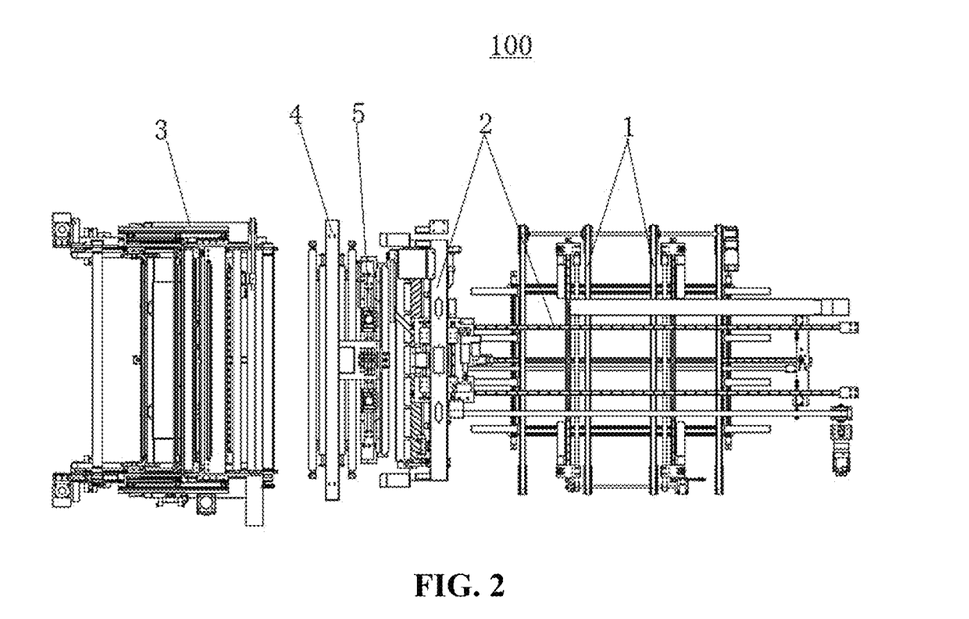
FIG. 2 is a schematic top view showing the structure of an embodiment of the present application.
Figure 3:
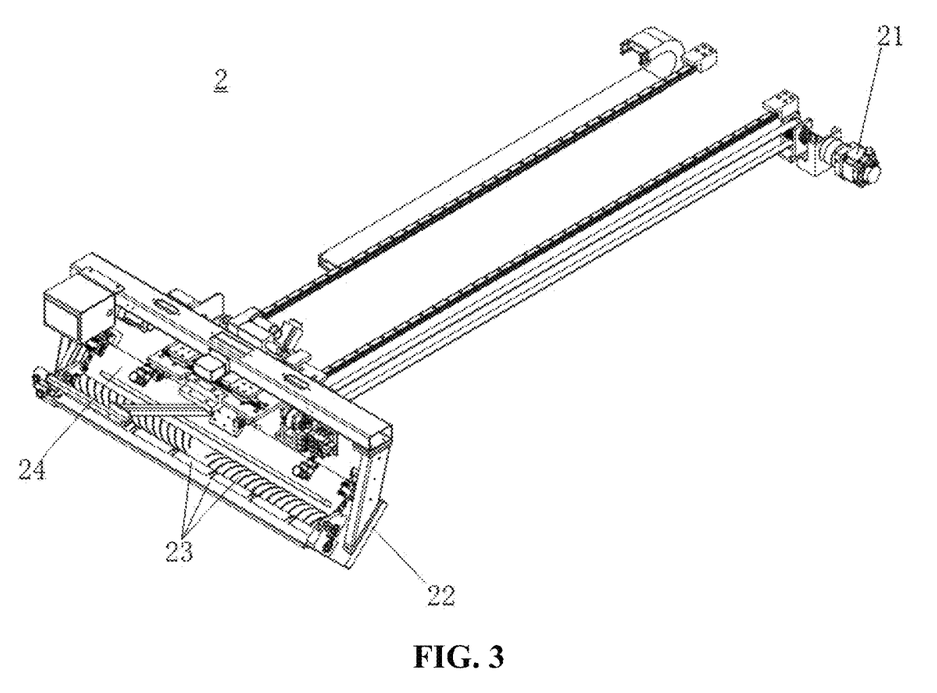
FIG. 3 is a schematic structural diagram of a film laying mechanism in an embodiment of the present application.

The film laying mechanism 2 includes a first driving member 21, a first supporting plate 22 driven by the first driving member 21 to move in the perpendicular direction of the conveying direction of the panel conveying mechanism 1, a film feeding unit 23 and a cutting unit 24 arranged on the first supporting plate 22, and a tail end pressing unit 25 located on a side of the panel conveying mechanism 1 and configured to clamp a tail end of a film. The cutting unit 24 is located on a film output side 238 of the film feeding unit 23.

In laying the film, the film output by the film feeding mechanism 3 passes through the film feeding unit 23 and the cutting unit 24, the film feeding unit 23 clamps the end of the film, driven by the transfer of the first driving member 21, the film feeding unit 23 moves from one side of the panel to the opposite side, and then the film feeding unit 23 outputs a set length of film, to allow the end of the film to extend into the clamping range of the tail end pressing unit 25. Then, the tail end pressing unit 25 clamps the end of the film, the film feeding unit 23 and the cutting unit 24, driven by the transfer of the first driving member 21 again, return to the initial side of the panel, and the film is cut by the cutting unit 24 to complete the film laying.

In the process of the film feeding unit 23 and the cutting unit 24 moving from one side of the panel to the other side, to prevent the film from dragging and rubbing on the surface of the panel, in this embodiment, a height difference between the film output side 238 of the film laying mechanism 2 and the panel is a set distance. To ensure the laying effect of the film, the tail end pressing unit 25 in this embodiment directly presses the film on the panel, the panel herein may be a glass plate/sheet or a battery panel, etc. By directly pressing the film on the panel and then cooperating with the return movement of the film feeding unit 23 from the other side of the panel to the initial side, the film laying position is subjected to the conveying force of the film feeding unit 23 so that the film at the attaching position is attached to the panel while being subjected to a certain pressure, thereby greatly improving the film laying effect; and the film feeding unit 23 is used to strictly control the film conveying so that the film can be kept in a completely flat state, and thus the film laying on the surface of the panel is completed. The film feeding unit 23 also maintains the feeding state during the film laying, which, compared with the conventional equipment, improves the horizontal movement speed of the film feeding unit 23, and also can maintain the laying effect, thereby improving the laying speed.

Figure 4:
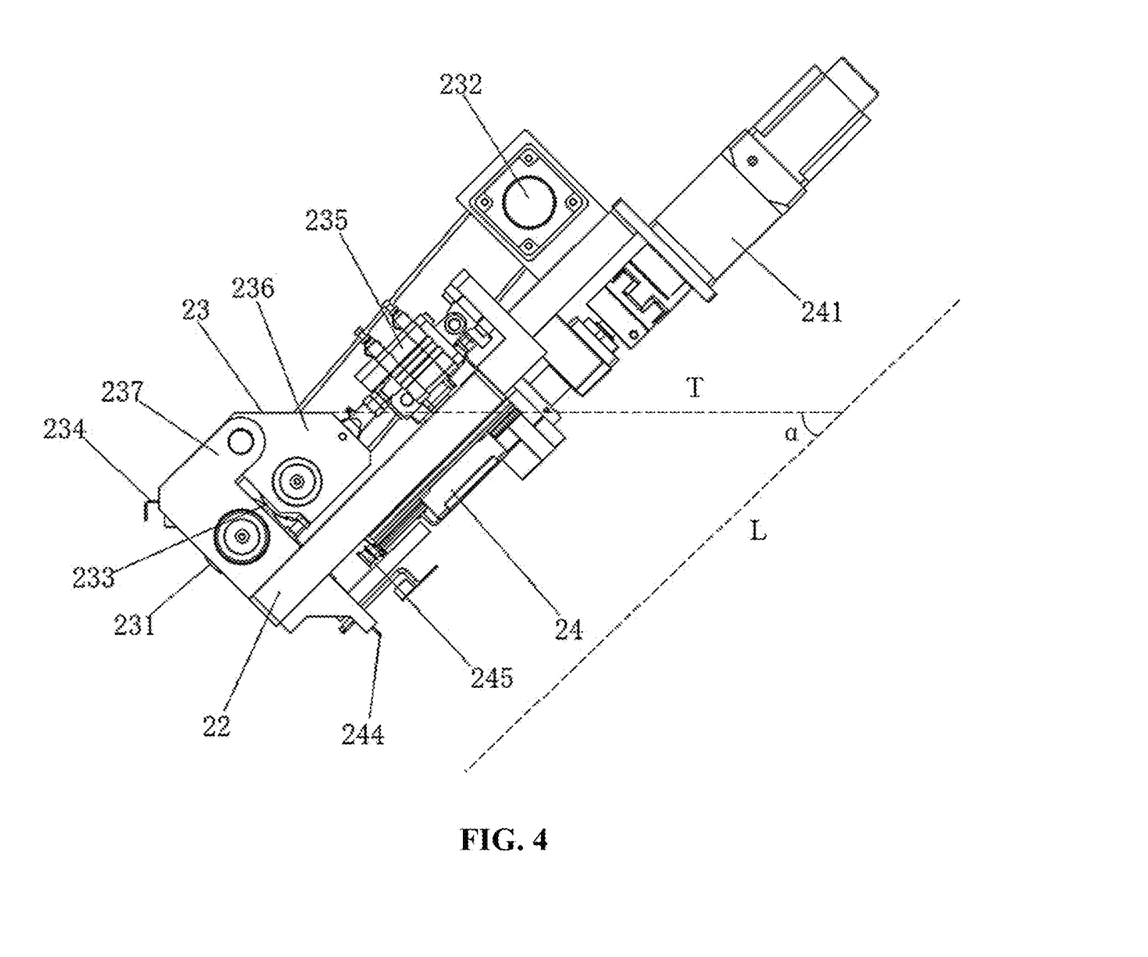
FIG. 4 is a schematic side view showing the structure of a film feeding unit and a cutting unit in an embodiment of the present application.

Referring to FIG. 4, to ensure that the end of the film can be conveyed into the clamping range of the tail end pressing unit 25 and be better clamped by the tail end pressing unit 25 against the surface of the panel, a feeding direction T of the film feeding unit 23 in this embodiment is arranged at a set angle α with the horizontal plane L. For example, the angle range of α is from 30 degrees (°) to 60 degrees (°). The angle may be flexibly set depending on requirements to ensure that the end of the film is accurately conveyed to the surface of the panel.

Figure 5:
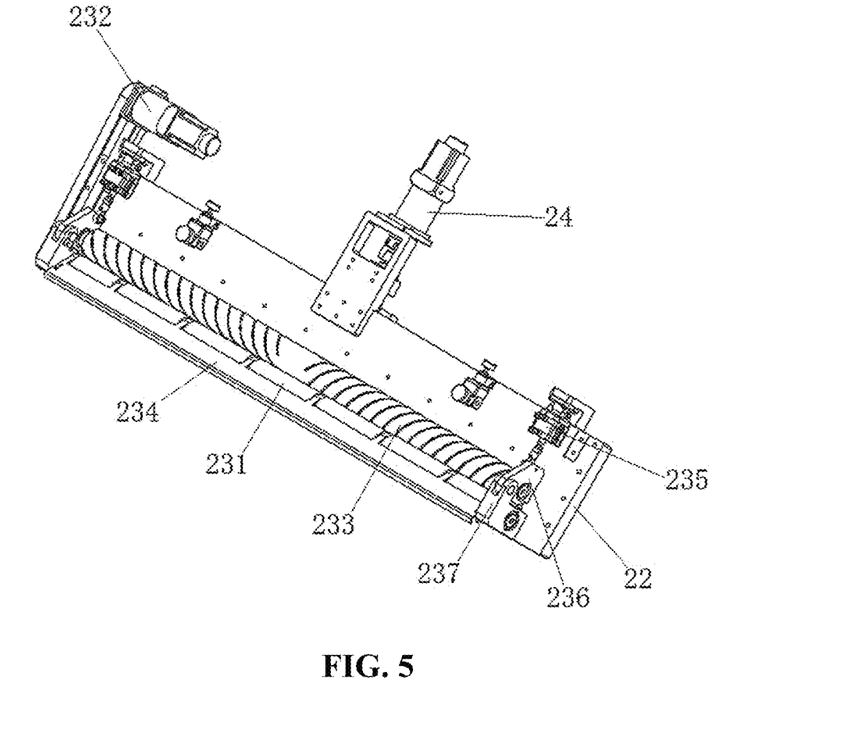
FIG. 5 is a schematic structural diagram of the film feeding unit in an embodiment of the present application.

In this embodiment, the film feeding unit 23 includes a lower driving roller 231 rotatably arranged on the first supporting plate 22, a third driving member 232 configured for driving the lower driving roller 231 to rotate, and an upper clamping roller 233 cooperating with the lower driving roller 231 to realize film conveying. A fifth supporting plate 234 is arranged on a film input side formed by the upper clamping roller 233 and the lower driving roller 231, which holds the film to ensure that the film can be accurately and effectively input between the upper clamping roller 233 and the lower driving roller 231. When the film is replaced or the film feeding unit 23 is repaired and inspected, in order to facilitate operation, the upper clamping roller 233 is driven by a first cylinder 235 to move close to or away from the lower driving roller 231, so as to control the application and release of the holding force of the upper clamping roller 233 on the lower driving roller 231. To simplify the structure of the film feeding unit 23, in this embodiment, two ends of the upper clamping roller 233 are rotatably arranged on a pair of fourth supporting plates 236 through bearings, a first end of each fourth supporting plate 236 is hinged to a hinge seat 237, and a second end of each fourth supporting plate 236 is hinged to a movable end of the first cylinder 235. A fixed side of the first cylinder 235 is hinged on the first supporting plate 22. Driven by the first cylinder 235, the upper clamping roller 233 may rotate and swing about a support axis formed by the hinge seat 237, thereby closely attaching the lower driving roller 231 and separating from the lower driving roller 231, which is convenient for film passing through and maintenance. Furthermore, in this structure, a slidable rail structure in the related art is omitted, and the overall structure is more concise. In this embodiment, a circumferential surface of the upper clamping roller 233 is symmetrically provided with bidirectional thread grooves to prevent film deflection.

Figure 6:
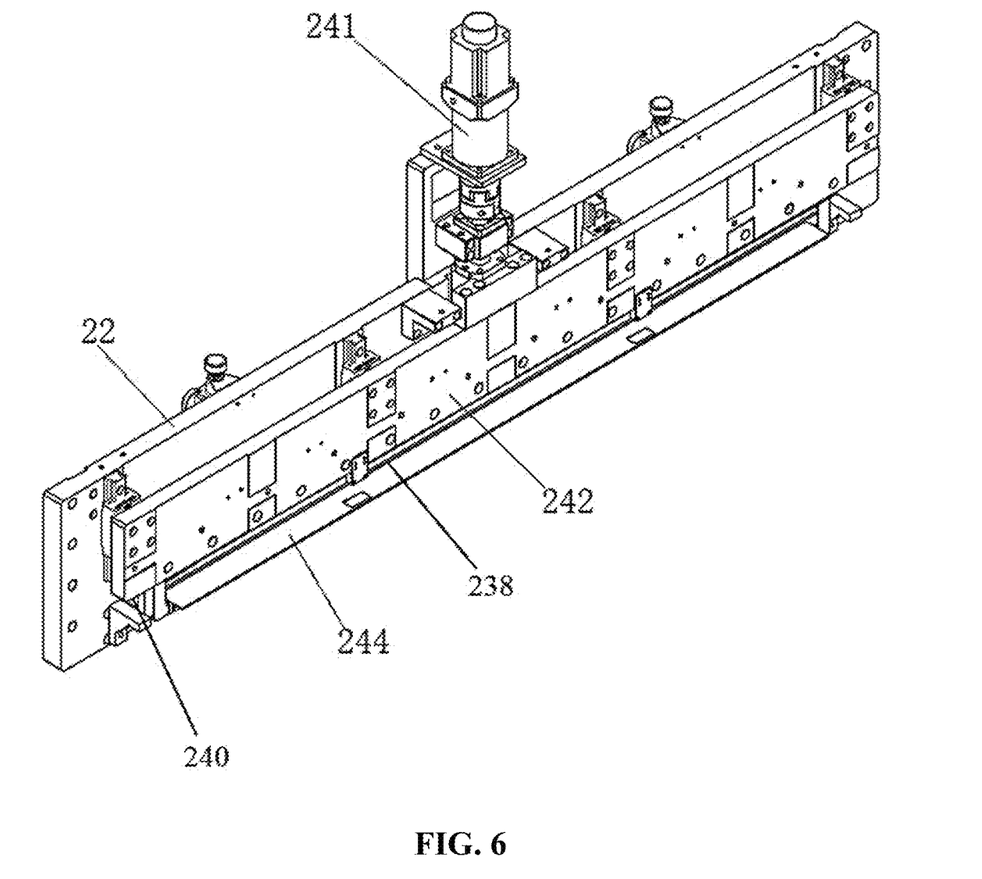
FIG. 6 is a schematic structural diagram of the cutting unit in an embodiment of the present application.
Figure 7:
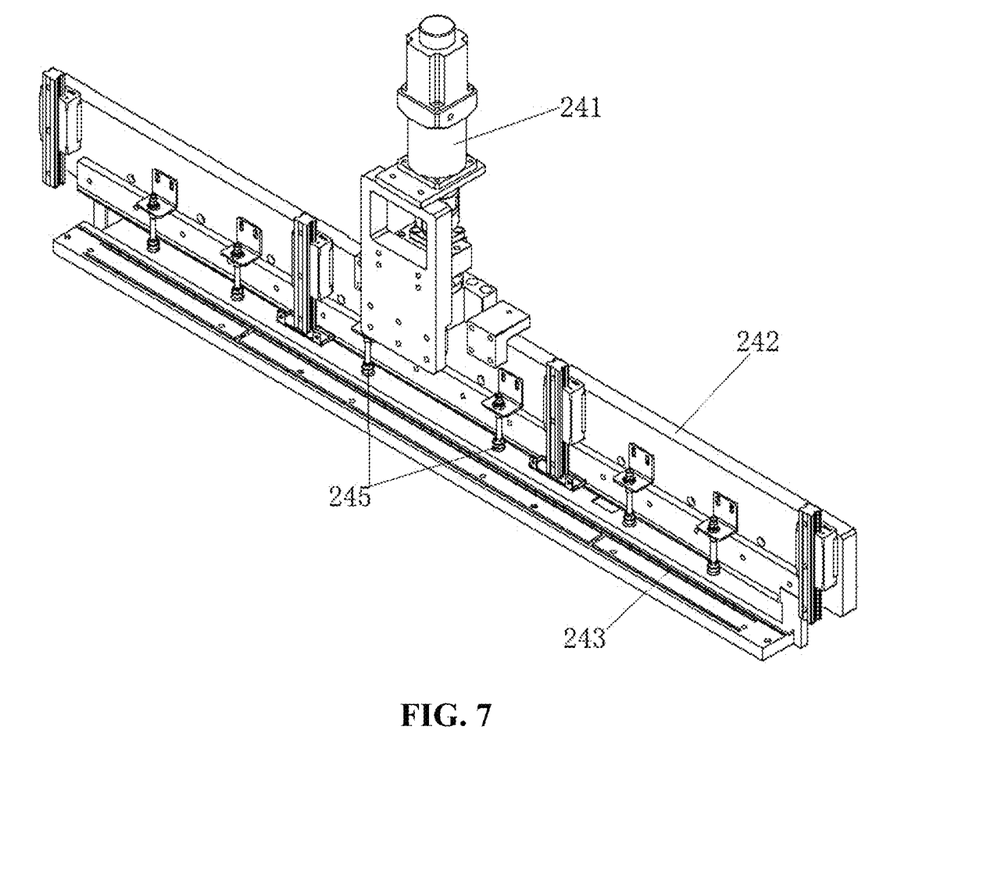
FIG. 7 is a schematic structural diagram of the cutting unit from another angle in an embodiment of the present application.

The cutting unit 24 includes a second driving member 241 fixed onto the first supporting plate 22, a second supporting plate 242 driven by the second driving member 241 to move up and down, an upper cutter 240 fixed onto the second supporting plate 242, and a lower cutter 243 located below the upper cutter 240 and cooperating with the upper cutter 240 for cutting. A third supporting plate 244 configured to hold and drag the film is provided on an output side of the cutting unit 24, and two ends of the third supporting plate 244 are fixedly connected below the second supporting plate 242 through a connecting member. The supporting plane of the third supporting plate 244 is arranged parallel to the feeding direction of the film feeding unit 23. To ensure the cutting effect, multiple pressing nozzles 245 configured to press the film close to the cutting position are further provided on the second supporting plate 242. The pressing nozzles 245 are in communication with the air source. During cutting, the film is pressed by the pressing nozzles 245, and after cutting, the pressing nozzles 245 blow air towards the film to prevent the film from sticking to the cutter.

In other embodiments, the cutting unit 24 may also adopt a rolling cutting manner. For example, the cutting unit 24 in this embodiment adopts a line cutting manner.

In this embodiment, multiple supporting rollers 13 are arranged on the right and left sides of the conveying unit 11. The supporting rollers 13 are arranged to support the edges of the panel. When the tail end pressing unit 25 presses down to tightly press the film, the supporting rollers support the edges of the panel to prevent the panel from being damaged. The tail end pressing unit 25 includes a second cylinder 251, a pressing plate 252 driven by the second cylinder 251 to move up and down, and a lower supporting block 253 located below the pressing plate 252 and used for supporting the panel. The pressing plate 252 and the lower supporting block 253 are made of plastic or rubber to avoid hard contact with the panel.

In this embodiment, the tail end pressing unit 25 is fixed onto the panel positioning unit 12, for example, the tail end pressing unit 25 is fixed onto the positioning module on one side of the right and left positioning modules 122 and moves together with the positioning module on this side to be above the panel edge, and then the second cylinder 251 is started to drive the pressing plate 252 to press tightly the film on the panel. In other embodiments, the tail end pressing unit 25 may also be fixedly arranged above the panel conveying mechanism 1, and when the panel is conveyed to the right place and all sides of the panel are positioned, the tail end pressing unit 25 presses tightly the film downward from the top.

The film feeding mechanism 3 may adopt the film feeding mechanism in the related art, which can be a single-axis feeding mechanism or a double-axis feeding mechanism, such as a film spreading machine disclosed in a patent with publication No. CN114132778A.

Figure 9:
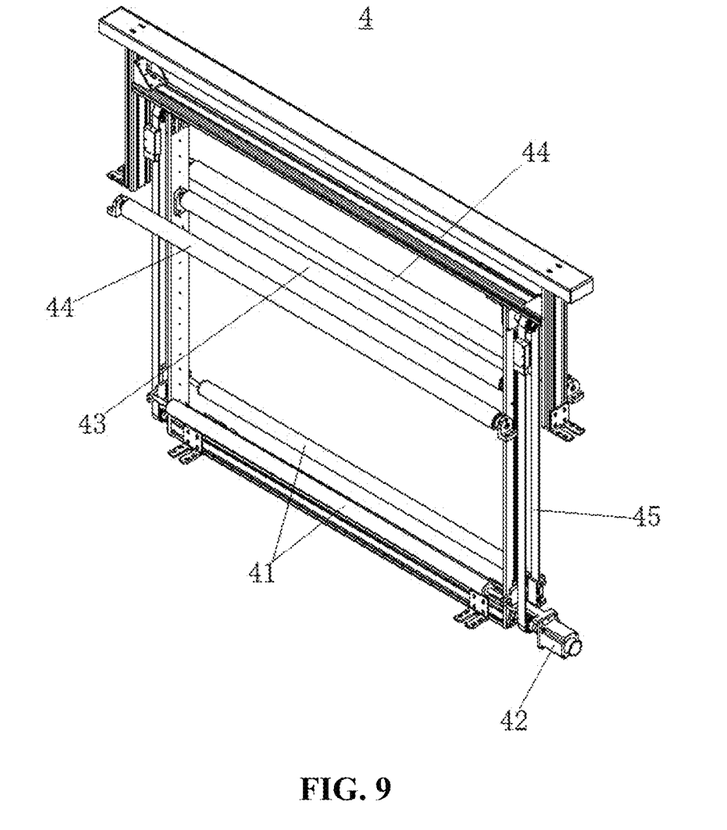
FIG. 9 is a schematic structural diagram of a buffer mechanism in an embodiment of the present application.

The buffer mechanism 4 includes multiple fixed roller groups with fixed height positions, a pair of movable rollers 41 with adjustable height positions, and a fourth driving member 42 for driving the pair of movable rollers 41 to move up and down. The fixed roller groups include a first roller 43 located in the middle and a pair of second rollers 44 located on two sides of the first roller 43. In the conveying direction of the panel, one of the movable rollers 41 is located between the first roller 43 and one of the second rollers 44, and the other movable roller 41 is located between the first roller 43 and the other second roller 44. Two ends of each movable roller 41 are fixedly arranged on two vertically arranged circulating transmission belts 45, and the fourth driving member 42 may drive the transmission belts 45 to perform vertical circulating transmission, thereby driving the movable rollers 41 to achieve automatic adjustment of the height position. The film is wound from the output end of the film feeding mechanism 3 to pass by the second roller 44A, the movable roller 41A, the first roller 43, the movable roller 41B, and the second roller 44B in sequence, and is then output to the punching mechanism 5.

The punching mechanism 5 may adopt the EVA/TPT punching mechanism in the related art, such as the "hole punching mechanism" in an EVA cutting and laying machine disclosed in the patent with publication No. CN112390048A.

Figure 10:
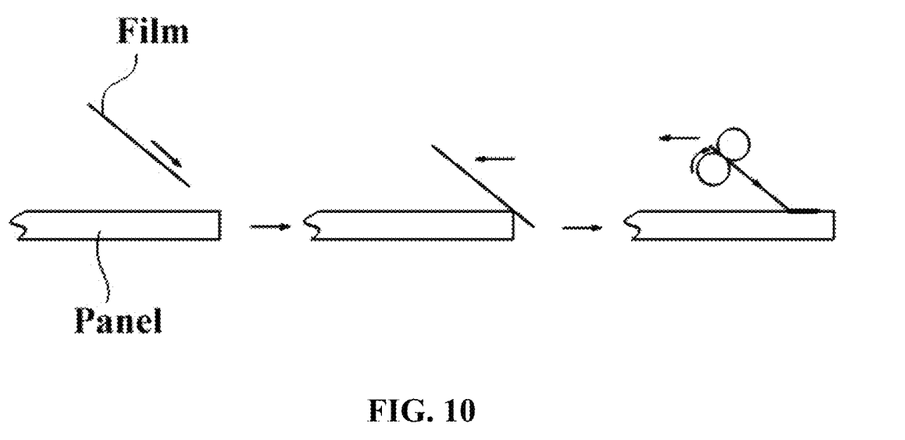
FIG. 10 is a schematic structural diagram showing some states while the film is laid in an embodiment of the present application.

A film laying method for photovoltaic modules is further provided in this embodiment, which includes the following steps:

In S1, the film feeding unit 23 is used to clamp an end of a film and move the film from one side of the panel to the other opposite side, for example, the film feeding unit 23 clamps the end of the film and pulls it from one side of the panel to the other opposite side, and a distance between the film and the panel is maintained at a set height. To improve the film covering efficiency, it is recommended that the film pulling action is set before the panel is input in place, or at the same time as the panel is input, to avoid waiting for film pulling after the panel is in place, thereby reducing invalid waiting time.

In S2, after the film is pulled in place, the film feeding unit 23 continues to output a film with a set length at a set angle with the surface of the panel so that an end edge of the film is tilted downward and extends out of the edge of the panel.

In S3, the film feeding unit 23 moves horizontally backward by a set distance so that the end edge of the film can be attached to the surface of the panel and move to an initial position of film laying.

In S4, the tail end pressing unit 25 is used to tightly press the end of the film downward so that the end of the film is tightly attached to the surface of the panel and this state is maintained.

In S5, the film feeding unit 23 is driven to return to the initial side of the panel, on the way of returning, the film feeding state is maintained, and a film feeding speed is made the same as a speed of the returning of the film feeding unit 23. In this embodiment, the film having a relative displacement relative to the upper clamping roller 233 and the lower driving roller 231 represents the film feeding state. In the process of film laying, the film feeding state is maintained, in one aspect, the film feeding unit 23 has a clamping force on the film, which, compared with the film supporting mechanism in the original setting that uses the film's sag due to its own weight for laying, can effectively avoid the film from sagging too much under its own gravity to cause wrinkles; in another aspect, the film feeding unit 23 has a conveying force on the film, so when the film adheres to the surface of the panel, the conveying force can form a certain extrusion force on the film in the direction of its own physical curvature, which, compared with the film supporting mechanism in the original setting that uses the film's sag due to its own weight for laying, greatly improves the adhesion between the film and the surface of the panel, thereby improving the laying effect; in still another aspect, by strictly controlling the output speed and conveying length of the film through the film feeding unit 23, the film can be ensured to be in a completely flattened state, without film wrinkles or film pulling, and it is strictly ensured the film laying in a line laying mode rather than a surface laying mode, thereby effectively avoiding the occurrence of bubbles and improving the laying effect; and finally, the dynamic feeding action of the film is used to offset the pulling effect of the film feeding unit 23 on the film when the film feeding unit 23 returns, which can effectively prevent the film from being broken by the pulling.

In S6, after the film feeding unit 23 returns to the initial side of the panel, the cutting unit 24 is used to cut off the film on the output side of the film feeding unit 23 to complete the film laying.

In the film laying method, to facilitate the layout of the equipment, in this embodiment, the film feeding unit 23 and the cutting unit 24 are both arranged on the first supporting plate 22, and the first supporting plate 22 is driven by a first driving member 21 to move horizontally. In other embodiments, the film feeding unit 23 and the cutting unit 24 may also be arranged separately. For example, the film feeding unit 23 is driven by the first driving member 21 to move horizontally above the panel conveying mechanism 1, while the cutting unit 24 is arranged below the panel conveying plane and located at a position on the initial side of the film pulling. After the film laying is completed, the film feeding unit 23 returns to the rear side of the cutting unit 24 (with reference to the film feeding direction, the forward conveying direction is the front side, and the reverse conveying direction is the rear side), and then the cutting unit 24 rises upward to cut off the film.

In the film laying apparatus and laying method according to the embodiments of the present application, the film feeding unit 23 and the cutting unit 24 are integrated on a movable panel and driven by a horizontal driving mechanism to be horizontally transferred. The film feeding unit 23 realizes feeding of film in one aspect, and realizes pulling action on the film in another aspect, thereby eliminating the additional pulling mechanism in the original equipment. By utilizing the pulling force of the film feeding unit 23 on the film and the height difference design of the film feeding unit 23 with respect to the surface of the panel, there is no need to support the bottom of the film, thereby eliminating the film supporting mechanism in the original equipment, and also the horizontal transfer driving mechanism of the film supporting mechanism. The film feeding unit 23 is arranged on the transfer mechanism for cooperating the film laying, the clamping force of the film feeding unit 23 on the film is used to cooperate with the feeding action, in conjunction with the reverse horizontal moving of the film feeding unit 23 to complete the film laying, which enhances the laying effect. The entire laying process eliminates the film supporting action, the transfer of the film supporting mechanism and the returned transfer of the film pulling mechanism in the original equipment, which improves the laying efficiency. In addition, the film feeding unit 23 is used to perform laying action, which increases the laying speed.

What is claimed is:

1. A high-efficiency automatic film laying apparatus, comprising a panel conveying mechanism, and a film laying mechanism arranged above the panel conveying mechanism; wherein the film laying mechanism comprises a first driving member, a first supporting plate driven by the first driving member to move horizontally, a film feeding unit and a cutting unit arranged on the first supporting plate, and a tail end pressing unit configured to tightly press a tail end of a film onto a surface of a panel, wherein the cutting unit is located on a film output side of the film feeding unit;

wherein the cutting unit comprises a second driving member fixed onto the first supporting plate, a second supporting plate driven by the second driving member to move up and down, an upper cutter fixed onto the second supporting plate, and a lower cutter located below the upper cutter and configured to cooperate with the upper cutter for cutting; a third supporting plate is provided on an output side of the cutting unit and configured to hold the film, and two ends of the third supporting plate are fixedly connected below the second supporting plate through a connecting member; and a supporting plane of the third supporting plate is arranged parallel to a feeding direction of the film feeding unit.

2. The high-efficiency automatic film laying apparatus according to claim 1, wherein a height difference between the film output side of the film laying mechanism and the surface of the panel on the panel conveying mechanism is a set distance.

3. The high-efficiency automatic film laying apparatus according to claim 2, wherein a feeding direction T of the film feeding unit is arranged at a set angle α with a horizontal plane L.

4. The high-efficiency automatic film laying apparatus according to claim 1, wherein a feeding direction T of the film feeding unit is arranged at a set angle α with a horizontal plane L.

5. The high-efficiency automatic film laying apparatus according to claim 1, wherein the film feeding unit comprises a lower driving roller rotatably arranged on the first supporting plate, a third driving member configured to drive the lower driving roller to rotate, and an upper clamping roller configured to cooperate with the lower driving roller to realize film conveying.

6. The high-efficiency automatic film laying apparatus according to claim 5, wherein the upper clamping roller is driven by a first cylinder to move close to or away from the lower driving roller; and two ends of the upper clamping roller are rotatably arranged on two fourth supporting plates through bearings, a first end of each of the two fourth supporting plates is hinged to a hinge seat and a second end of each of the two fourth supporting plates is hinged to a movable end of the first cylinder.

7. The high-efficiency automatic film laying apparatus according to claim 1, wherein a plurality of pressing nozzles are provided on the second supporting plate and configured to tightly press the film close to a cutting position, and the plurality of pressing nozzles are in communication with an air source.

8. The high-efficiency automatic film laying apparatus according to claim 1, further comprising a film feeding mechanism configured to feed the film laying mechanism, a buffer mechanism and a punching mechanism disposed between the film feeding mechanism and the film laying mechanism.

9. The high-efficiency automatic film laying apparatus according to claim 1, wherein the panel conveying mechanism comprises a conveying unit and a panel positioning unit configured to position four sides of the panel on the conveying unit, and the panel positioning unit comprises front and rear positioning modules and right and left positioning modules; and the tail end pressing unit comprises a second cylinder, a pressing plate driven by the second cylinder to move up and down, and a lower supporting block located below the pressing plate and configured to support the panel; and the tail end pressing unit is fixed onto a positioning module on one side of the right and left positioning modules, the tail end pressing unit is configured to move together with the positioning module on the one side to be above an edge of the panel, and then the second cylinder drives the pressing plate to press tightly the film on the panel downward.

10. A high-efficiency automatic film laying method, comprising:
  clamping, by a film feeding unit, an end of a film to move the film from one side of a panel to an opposite side of the panel, and maintaining a set height between the film and the panel; wherein a feeding direction of the film feeding unit is arranged at a set angle with a horizontal plane;
  after the film is pulled in place, outputting, by the film feeding unit, a film of a set length continuously to make an end edge of the film to be tilted downward and extend out of an edge of the panel;
  moving the film feeding unit horizontally backward by a set distance to make the end edge of the film to be attached to a surface of the panel and move to an initial position of film laying;
  pressing, by a tail end pressing unit, an end of the film tightly downward to make and maintain the end of the film to be tightly attached to the surface of the panel;
  driving the film feeding unit to move horizontally and return to an initial side of the panel, wherein the film feeding unit maintains a film feeding state on a way of returning so that a film feeding speed is the same as a speed of the returning of the film feeding unit; and
  after the film feeding unit returns to the initial side of the panel, cutting off, by a cutting unit, the film on an output side of the film feeding unit to complete the film laying.

11. The high-efficiency automatic film laying method according to claim 10, wherein the film feeding unit and the cutting unit are both arranged on one first supporting plate, and the first supporting plate is driven by a first driving member to move horizontally.

* * * * *